United States Patent [19]

Riccardi

[11] Patent Number: 5,458,696

[45] Date of Patent: Oct. 17, 1995

[54] PROCESS FOR CUTTING BLOCKS OF METAL

[75] Inventor: Joseph J. Riccardi, Bristol, Wis.

[73] Assignee: Southwind Enterprises, Inc., Sudbury, Canada

[21] Appl. No.: 301,702

[22] Filed: Sep. 7, 1994

Related U.S. Application Data

[63] Continuation-in-part of Ser. No. 92,130, Jul. 22, 1993, Pat. No. 5,350,462.

[51] Int. Cl.⁶ ........................................................ B23K 7/00
[52] U.S. Cl. ............................................ 148/194; 266/48
[58] Field of Search ............................. 266/48; 148/194; 219/70, 75

[56] References Cited

U.S. PATENT DOCUMENTS

| | | | |
|---|---|---|---|
| 4,069,407 | 1/1978 | Brower | 266/48 |
| 4,114,863 | 9/1978 | Campana | 266/48 |
| 4,182,947 | 1/1980 | Brower | 266/48 |
| 4,416,444 | 11/1983 | Brower | 266/48 |

*Primary Examiner*—Scott Kastler
*Attorney, Agent, or Firm*—Jansson & Shupe, Ltd.

[57] ABSTRACT

A process for cutting very large solidified pools of metal and metallic structures by flame cutting by means of an improved burning bar is described. The cutting is conducted by a hot flame composed of very hot high pressure oxygen exiting from a burning bar packed with intermingled mild steel and aluminum rods. The hot flame or blast of oxygen melts and mobilizes the molten metal by creating a molten stream and jettisoned molten droplets and oxidized particles.

11 Claims, 2 Drawing Sheets

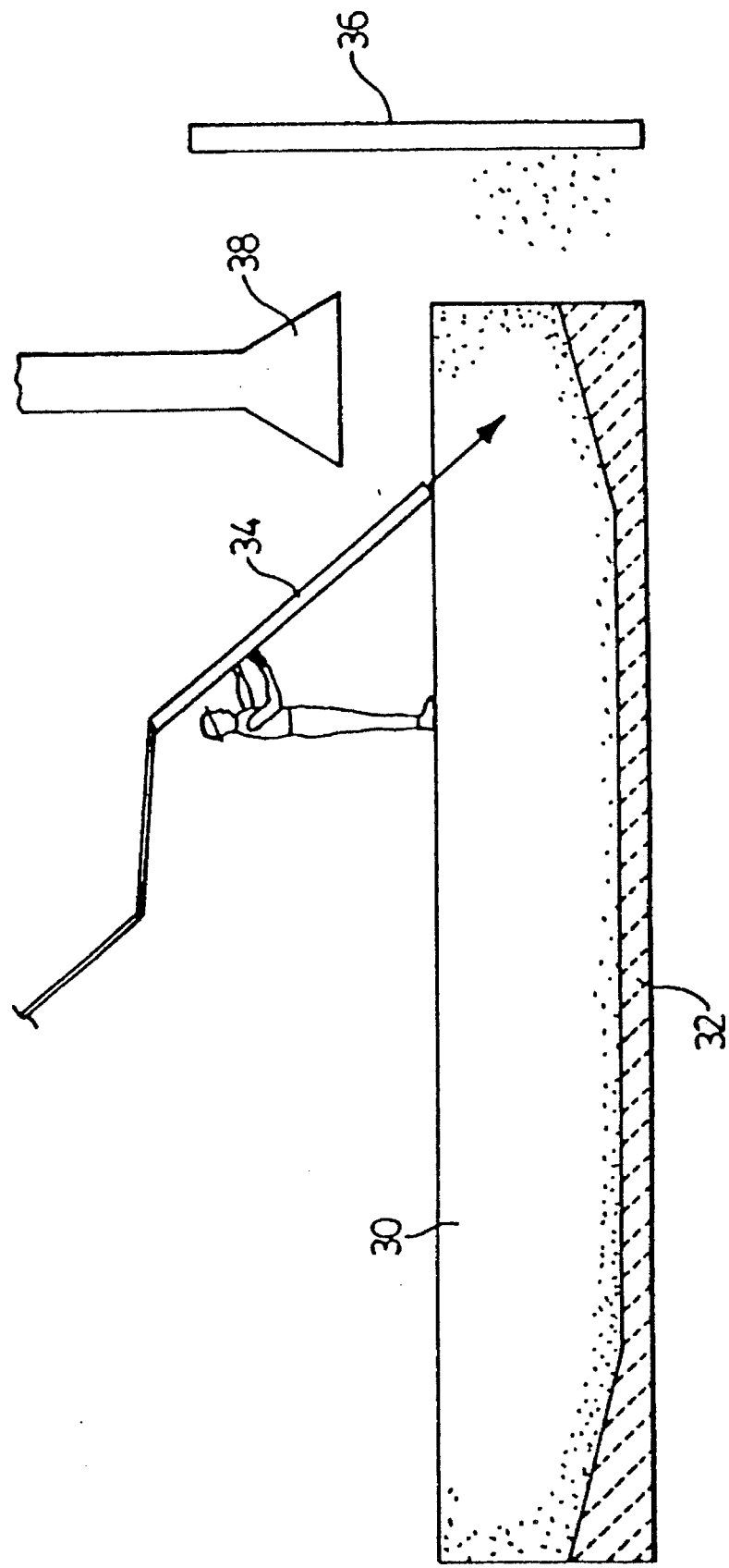

PROCESS FOR CUTTING BLOCKS OF METAL

RELATED APPLICATION

This application is a continuation-in-part of application Ser. No. 08/092,130, filed Jul. 22, 1993 now U.S. Pat. No. 5,350,462.

FIELD OF THE INVENTION

This invention is related to cutting ferrous and non-ferrous metals and breaking up refractory structures by the action of heat impinging on it, more particularly cutting thick blocks of metal by very high temperature flame.

Sheets and slabs of metal and chilled process residues retained by high temperature installations otherwise known as "metal heels" are known to be cut by a flame travelling along the material to be cut. The flame impinging on a solid metallic surface of the sheet is sufficiently hot to melt the sheet in a small area. This method may also be used in welding two separate pieces of metal together, whereby the melt refreezes to form a seam bonding the pieces of metal together.

In some other applications large, substantially non-metallic, refractory structural elements, such as concrete walls or similar structures, may be demolished by means of a series of holes or similar discontinuities created by a hot flame impinging on the surface, and subsequently applying a large mechanical force and breaking the structure. In all the above instances, the molten metal or molten concrete, which is the result of applying a very hot flame to a small area of the surface of the metal or concrete, will refreeze as soon as the molten substance ceases to be in contact with the hot flame. The refreezing may come about either by the molten substance moving away from the flame thereby being chilled by its surroundings, or by the flame moving away from the molten pool created. In other words, a gap or a hole may be the result of melting but the molten substance will move only a relatively small distance before it refreezes and is immobilized.

Thermal torches, oxygen lances or burning bars are conventionally used to cut relatively thick sheets of metal, melting surfaces of metallic objects for refinishing or demolishing wall structures. Thermal torches are also used to increase the bulk temperature of very large blocks of metal for subsequent heat treatment in the solid state.

Conventional oxygen lances or burning bars consist of a steel pipe containing steel rods, as well as conventional burning bars have oxygen containing gas blown through the steel pipe at relatively high pressures. Conventional burning bars are operated mostly between 70 120 psi pressure. The oxygen containing gas is usually supplied from a gas cylinder, compressed air installation or other sources capable of providing an oxygen containing gas at moderate volumes and pressures. The steel pipe and the rods within the steel pipe are ignited at one end, then the oxygen containing gas blown through the pipe will oxidize the pipe and the rods therein, thereby producing a hot flame. The temperature of the flame of conventional burning bars may be increased by known conventional methods, such as fuel addition provided in a concentric external pipe, and/or various other structural improvements in the design of the burning bar.

The metallurgical industry often produces large blocks of metal, solidified slag, matte, and similar solidified residual burden of various composition as by-product which need to be cut into smaller, more readily handleable pieces to be recharged to furnaces for further recovery or processing. In other instances, large furnaces utilized in a metal extractive process step, require relining or rebuilding. The furnaces to be rebuilt usually have solidified pools of metal, matte and remains of slag, sometimes known as "heel", collected in the bottom of the furnace. So that the relining or similar refurbishing work can take place, the solid metal or "heel" together with a portion of the refractory lining needs to be removed. Cutting up of such large bodies of solid metal by the utilization of conventional burning bars is a slow and costly process due to the molten metal refreezing in the proximity of the groove cut by the flame.

There is a need for a method, and a need for a burning bar, to impart sufficient heat to a large block of metal in order to melt it in small areas, and move the molten metal from the cut or groove created before the metal resolidifies or refreezes.

An improved method has now been found for cutting of large blocks of metal into smaller pieces by means of increasing the flow rate of the hot gas through a burning bar, thereby melting a groove into the block of metal, and simultaneously mobilizing the melted and partially oxidized metal particles out of the groove.

The improved method for cutting large blocks of metal having melting points in excess of 1000° C. into smaller portions, comprises the steps of:

i) introducing into a mild steel pipe having two opposing ends adapted to be air-tightly connectable, mild steel rods and aluminum rods, said rods being coextensive with said mild steel pipe and intermingled with one another, said aluminum rods comprising up to 20 wt % of said pipe and said rods within said pipe, and packing said rods such that a gas containing at least 80% oxygen introduced at a pressure of at least 80 psi and at least 45 cubic feet per minute flow rate at one end of said pipe is capable of substantially unimpeded passage;

ii) connecting said mild steel pipe to a handle adapted to receive one end of said mild steel pipe, said handle having valve means adapted to introducing gas to said mild steel pipe at high pressure;

iii) igniting to burn said opposing end of said mild steel pipe and said rods therein, and introducing gas containing at least 80% oxygen into said mild steel pipe at a mass flow rate of at least 45 cubic feet per minute and which is in excess of the amount capable of sustaining burning of said pipe and rods therein, thereby producing a blast of hot oxygen containing gas exiting from said mild steel pipe, said blast being capable of melting and mobilizing molten metal; and, iv) impinging said blast of hot oxygen containing gas on the surface of a solid block of metal having melting point in excess of 1000° C., thereby melting a groove into said surface of said solid block of metal and mobilizing the melted metal out of said groove.

The process of this invention may be used for flame cutting large solidified blocks of metal and alloys of metal, which melt above 1000° C., into smaller sections. The sections thereby become movable and handleable by conventional equipment such as a crane and/or bulldozer.

The molten metal, which is .expelled out of the cut grooves, is collected as solidified droplets or particles of oxides, and may subsequently be recycled to extractive process steps for further recovery.

BRIEF DESCRIPTION OF THE DRAWINGS

A preferred embodiment of the process is illustrated by way of example in the attached Figures in which:

FIG. 2 shows schematically an operator conducting the process.

DETAILED DESCRIPTION OF THE INVENTION

Figure 1:
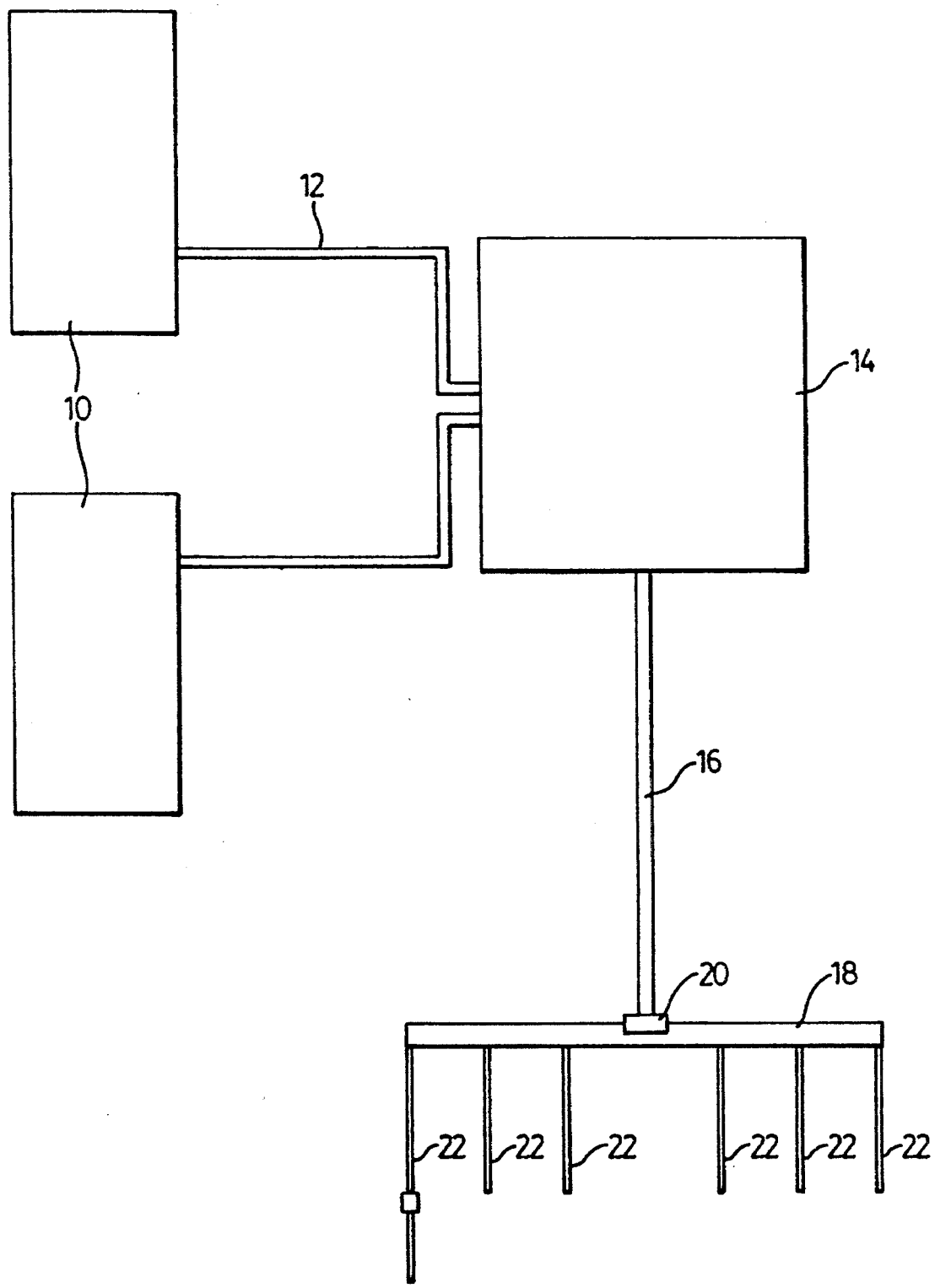
FIG. 1 shows schematically the gas supply to the burning bar.

Conventional cranes and handling equipment are not usually capable of moving large solid structural metallic bodies which are encountered in the course of demolishing a building, nor can they handle large solidified pools of metal, such as are found in smelting furnaces, converters, ladles and similar vessels which have been cooled and temporarily taken out of operation. Such solid pools are encountered when furnaces are to be refurbished or relined, and the block of solidified pool of metal, otherwise known as "heel", is required to be removed from the furnace so that the refurbishing operation may take place. The blocks of metal to be cut to smaller portions by the present invention are at least 6 inches thick but may be of the order of 1 to 2 feet thick, and occasionally close to ten feet thick, their length and breadth is usually substantially in excess of their thickness; in other words, the blocks are usually of extensive and coherent bulk and weight.

The cut up portions of the large blocks of metal and the adhering refractory may be intended for the scrap heap but more often they are to be recycled to metal extractive process steps. Hence the cost of the operation needs to be kept low and the equipment utilized in the cutting of the large blocks needs to be operated at low cost. Moreover, the equipment has to be transported to and assembled readily at the site where the operation is to be performed.

It is customary to use flame cutting to reduce the size of such blocks of metal, however, even if the flame melts the metal of which the block is made as discussed hereinabove, it is not unusual that the molten metal solidifies in the groove, hence the time the cutting up operation takes is substantially prolonged.

Conventional methods of producing very high temperature flame include burning hydro-carbonaceous fuel in special double barrelled equipment which mixes oxygen with the hydro-carbonaceous fuel in the proximity of the point of ignition. Often the hydro-carbonaceous fuel may not be moved to the location where it is required, furthermore there is a hazard of explosion if the equipment is not carefully maintained and well handled.

The more usual way of cutting up blocks of metal is by means of burning bars. As mentioned before, the conventional burning bar consists of a steel pipe usually packed with rods of iron, and oxygen containing gas is blown into the pipe at pressures ranging from 70 to 100 psi, to generate a high temperature flame. A burning bar is nearly completely used up by combustion with oxygen while producing a high temperature flame. The performance of conventional burning bars has been known to be increased by special structural designs.

Another method of increasing the flame temperature of a burning bar, is by mixing the iron bars contained in the burning bar with another metal, such that the oxidation of the other metal by the oxygen-containing gas produces a higher heat of reaction. The theoretically available reaction heat generated when different metals are oxidized by one mole of oxygen, is compiled and listed in numerous publications. It can be readily shown that titanium, molybdenum, manganese, magnesium, aluminum and silicon, all generate substantially higher calorific heat when combusted in oxygen than iron. From practical considerations however, it is necessary that any metal burned or oxidized by combustion together with iron rods be available at low cost, be readily drawable into rods and have a melting temperature which is not much lower than that of iron.

As described above, the flame of a burning bar is usually a hot oxygen containing gas. The flame temperature is substantially determined by the heat generated by the combustion of the metal, and volume and mass of the gas that is heated by the heat generated by combustion. Thus the temperature of the flame will depend on the pressure and mass flow rate of the oxygen supplied to the combusting metals. Conventional burning bars, operated by combusting metal in oxygen containing gas at 70–100 psi pressure, are usually capable of melting metal having melting point over 1000° C., but the heat and the gas volume is insufficient to move the molten metal substantial distance from the flame, before the metal refreezes.

It has been surprisingly found that if mild steel rods are mixed and intermingled with aluminum rods in such a manner that the aluminum forms from 13–20 wt of the metallic mixture being burned, that is the pipe and the wires in the pipe, the heat generated by their combined combustion is sufficiently high to have the burning bars operate at substantially higher oxygen mass flow rate, that is at oxygen containing gas pressures higher than 80 psi flowing at a rate of 45 cubic feet per minute or higher. The gas flow rates set out in this disclosure and claims are the rates messured by standard instrumentation and are in term of standard temperature and pressure conditions (scfm). The gas having the above flow rate should contain at least 80% oxygen, but for best results it is preferred that the oxygen content of the gas is higher than 90%. The resulting high temperature flame will not only melt the metal or alloy of which the block of metal is made, but will also maintain the melt at sufficiently high temperature to cause it to flow out of the groove, or be blown out of the groove in form of flying droplets or solid oxidized particles created by the flame.

In the preferred embodiment of the present invention a pipe made of mild steel, having diameter and wall thickness dictated by convenience, is packed with a mixture of mild steel rods and aluminum rods. The mild steel pipe and the rods usually contain carbon in less than 1 wt %. The carbon present at the level indicated in the steel is known to modify the physical properties of the steel in allowing it to be drawn into rods and pipes. It is considered, that the carbon present in the mild steel does not substantially add to the heat generated by the combustion of the steel components. The diameter of the mild steel rods usually ranges within 0.1 and 0.2 inch diameter, however this is dictated by convenience only. It has been found that too fine rods will break or twist by the process of packing them into the steel pipe. Too thick rods, on the other hand, would reduce the area of interaction between the metal and the oxygen in the course of combustion.

The aluminum rods are usually and conveniently, of similar diameter as the mild steel rods. The aluminum rods are randomly intermingled with the steel rods, however, it is convenient to have an arrangement by which at least two mild steel rods are adjacent to one aluminum rod. Bunching of aluminum rods should be avoided so that pools of molten aluminum within the pipe before combustion are not formed. Without necessarily being bound by this explanation, the aluminum is required to be thoroughly dispersed between the iron rods so that the combustion of the two types of metal may occur simultaneously, thereby imparting maximum heat to the oxygen containing gas which has not been consumed in the combustion. A further benefit which may result from the thorough mixing of aluminum and iron rods is that in the process of combustion, iron aluminates are also formed which generate further reaction heat and thereby increase the flame temperature even higher.

It has been found that for best results the steel pipe packed with intermingled steel and aluminum rods contain aluminum in 16±2 wt % based on the total weight of the packed pipe.

The intermingled mild steel and aluminum rods which are in length co-extensive with the steel pipes, are packed into the mild steel pipe and arranged in such a manner that the steel pipe holds the rods securely but without substantially restricting or impeding the passage of an oxygen containing gas through the pipe. It has been found that for best results the pressure of the oxygen containing gas is at least 80 psi, but may extend to 250 psi, at a high volume flow rate such as at least 45 cubic feet per minute, thereby translating into high mass flow rates.

It has been found convenient to have the oxygen containing gas in the .form of pure oxygen supplied from a liquid oxygen containing tank. A conventional evaporator or similar means, which will reduce the pressure of the oxygen under which it is liquified to the oxygen pressure required by the operation of the burning bar, is to be placed between the tank and the burning bar. Preferably a handle is attached to the steel pipe containing the rods for support of the burning bar and also to provide means for introducing the oxygen containing gas at the required pressure to one end of the burning bar. It is also preferred that the end of the burning bar and the handle be adjoined by threaded or flanged couplers or similar means in a substantially air-tight manner.

For the sake of clarity, the gas fed to the burning bar of the present invention will be referred to hereinbelow as oxygen containing gas and is understood to contain between 80–100% oxygen.

At the start of its operation, the end of the burning bar not connected to the handle is initially heated up to red heat by some means, and simultaneously the oxygen containing gas is fed through the pipe at high mass flow rate. The oxygen containing gas will sustain the combustion of the rods in the pipe and the resulting high temperature blast of hot gas is directed to the metal surface which is to be cut by the flame or blast. The pressure of the oxygen containing gas or pure oxygen, is adjusted such that the blast will melt and mobilize the molten metal. Mobilizing is understood to mean that the molten metal is moved out of the groove created by melting by the force of the blast of hot gas. The moving or mobilizing of the molten pool of metal may be in the form of one of the following:

i) the continuous stream of molten metal running away from the groove;

ii) droplets flying through the air above, which are usually caught by some flat surface located in the proximity of the block/heel;

iii) particles of molten metal which have been instantly oxidized by the blast of the hot flame, and may be subsequently extracted by means of a fume exhaust device. It is usual that at least two of the above described forms of mobilization will take place simultaneously as a result of the action of the hot blast exiting the burning bar and impinging on the surface of the block of metal.

The molten metal stream may be collected and allowed to freeze in a trough or a gully, or some form of a ceramic ladle, to be utilized in further metal recovery.

Droplets moved by the blast may be collected under a splash board which is placed behind the groove during the cutting up operation. The solidified droplets may be subsequently fed to a recycling process.

Similarly, the oxidized solid particles are usually collected by the fume extracting device conveniently placed above the flame cutting operation, and recycled to further recovery. The fume extracting device is also useful in preventing the small particles which may be environmentally hazardous, from entering into the atmosphere.

The blast or hot flame generated by the burning bar of the present process, is used to cut large metallic blocks having substantial thickness. The blocks are usually made of metal such as copper, nickel, ferro-nickel, steel or alloys of these metals which apart from containing copper, nickel and iron, also contain other high melting point metals such as chromium, titanium, vanadium, molybdenum, manganese, tungsten and/or precious metals, in particular, platinum, rhodium and gold. The blocks may also be substantially made of a very high melting temperature metal, such as, zirconium, niobium, molybdenum, platinum and rhodium.

The large blocks of metal to be cut are usually contained in a refractory structure, such as for example, the bottom portion of a furnace. The refractory structure may be cut at the same time as the large block of metal utilizing the burning bar of the present invention, or as a separate process step. The refractory structure may also contain elements made of concrete. It is understood, that in the above process step description, the term refractory includes concrete.

It may be convenient to disconnect from the handle the burning bar which has burned down to a short length, and replace it with another burning bar of a convenient length. The short burnt-out bar is connected to the end of the new bar, so there is no wastage of short bar.

In another embodiment of this invention both ends of the burning bar are threaded or have coupler means to be interconnectable, so that several burning bars may be assembled to be held by the handle as described above. Other connecting means such as quick assembly connectors, flaring or even crimping can be used to connect the bars or remnants of bars.

In yet another embodiment, the handle is adapted to be attached to more than one burning bar by threaded means, thereby allowing the generation of more than one hot oxygen containing blasts. In this embodiment the cutting of the metal block may be performed in a parallel configuration.

EXAMPLES A and B

A burning bar was assembled by having 10½ foot long mild steel rods having 0.125 inches diameter intermingled with 10½ foot long aluminum rods having 0.12 inches diameter, into approximately 10 foot long mild steel pipe of ¾" bore and 1.05 inches external diameter. The aluminum content of the rods packed into the pipe was 31 wt %. The steel pipes and the rods met ASTM A-513 specification. The total weight of a ten foot section of the wire filled pipe was 23 lbs, containing 12 lbs of mild steel and aluminum wires. Thus the aluminum content based on the total weight of the pipe and the metal rods was 16.2 wt %. The rods were packed into the steel pipe such that their lengths were generally co-extensive with the steel pipes, that is in such a manner that the rods were not longer by more than 1 inch than the pipe. The pipe had one flared end and another plain end.

A handle which had a conventional pressure adjusting valve adjoined to it for allowing oxygen inlet and adjustment of the oxygen flow rate, was connected by internally threaded means to one end of the threaded end of the steel pipe packed with rods. The end of the steel pipe and the handle made an airtight connection.

Oxygen gas, provided by a tank of liquid oxygen and fed through a conventional evaporator, was fed to the pipe by means of the valve in the handle.

A schematic drawing showing the system hooked up is shown in FIG. 1.

Oxygen was fed from a liquid oxygen tank 10 through a hose 12 to an evaporator 14. More than one liquid oxygen tank may be used for large Jobs, furthermore, for a big job more than one burning bar and more than one operator may be employed simultaneously. A large pipe 16 transmits the oxygen from the evaporator 14 to a header 18. The header may be equipped with a safety valve 20. A plurality of hoses 22 then connects the header 181with individual burning stations comprising the bar described above.

The burning bars so assembled was used in:

A) cutting up by flame a large copper block being of seven foot thickness and 13 square foot surface, B) cutting up a ferro-nickel "heel" having a diameter of 60 feet and a depth of 8 feet.

The end of the burning bar which was not attached to the handle was heated to red heat, and the oxygen gas flow was turned on. The resulting flame or blast of hot oxygen gas was directed at an angle of about 45° to about 60° to the surface of the metal block in such a manner that the cutting operation started from the edge of the block and proceeded towards the middle.

In example A the metal block was substantially formed of copper. Copper melts at 1083° C. The mass flow rate of the gas fed through the valve to exit as a blast of hot oxygen gas from the burning bar was adjusted such that the molten copper ran away from the groove cut and the molten copper was collected in a trough at the foot of the block and allowed to freeze. The solidified copper was then returned to be processed in a converter. A splash board placed above the cut, collected the molten copper droplets and copper oxides blown out by the blast of the burning bar. The copper block was cut by the blast exiting from the burning bar into two feet wide segments, which could then be readily moved by appropriate conventional equipment.

In example B the blast of hot oxygen containing gas exiting from the burning bar described above, was used to cut up a "heel" of ferro-nickel retained in a ferro-nickel extracting furnace. The furnace was scheduled to be relined by refractory bricks. FIG. 2 is a schematic drawing illustrating the process in operation. A portion of the furnace wall (not shown) is removed to expose the edge of a heel 30 which overlies the refractory 32 forming the bottom surface of the furnace. An operator holds the burning bar 34 at an angle to direct the blast of hot gas onto the heel 30 at the upper surface. The groove was cut into the surface of the "heel" 30 by proceeding from the edge of the heel towards the middle. Ferro-nickel, depending on its nickel content, melts at close to 1500° C. The molten metal in the groove was blown out by the force of the blast partly as droplets, and partly as oxidized metal particles. The frozen droplets and oxidized metal particles collected at a splash board 36 located at the perimeter of the "heel" and by a hood 38 were recharged to the nickel extractive process. The heel was cut into slabs 1½ foot wide which were then removed from the furnace to be remelted in ladles. The removal of the "heel" allowed the relining of the furnace.

EXAMPLE C

Tests demonstrating the range of mass flow rate of the oxygen containing gas in which the burning bar of the present invention will efficiently cut metal, are tabulated below. Large blocks of copper, steel and concrete were cut with the burning bar assembled as described hereinabove, supplied with oxygen gas at pressures ranging between 80 to 190 psi, and flowing at 48 to 75 cubic foot per minute. Comments on the tests are summarized under remarks.

| Test # | Material | Pressure (psi) | Flow Volume (scfm) | Remarks |
| --- | --- | --- | --- | --- |
| 1 | Copper | 80 | 48 | A little sputtering of the molten droplets around the cut was noted, but burning seemed generally efficient. |
| 2 | Copper | 100 | 55 | No sputtering, efficient burning. Most of the molten copper was forced out of groove as molten stream of metal. |
| 3 | Copper | 120 | 65 | Molten metal was running away faster, cut in block clean and efficient, molten copper was moved quickly from the groove by the blast of hot oxygen. |
| 4 | Copper | 190 | 75 | Cutting was even faster and even cleaner cut was obtained than in test 3. |
| 5 | Steel | 120 | 65 | Block of steel was cut three times the speed as a similar sized block of copper was cut at the same pressure and flow rate of oxygen. |
| 6 | Concrete | 120 | 65 | Concrete block was cut at twice the speed of the copper block but slower than steel. Depth of cut: 4 inches of concrete. |

The above tests demonstrate that large blocks of metal and concrete may be cut efficiently and fast by the instant burning bar having oxygen containing gas flowing at a rate higher than 45 cubic foot per minute and pressures in excess of 80 psi.

The above tests further demonstrate that the mass flow rate of the oxygen containing gas through the burning bar is as important as the temperature of the flame. Copper melts at 1083° C., while steel melts at above 1500° C., but copper conducts heat away at a substantially faster rate than steel, hence more calorific heat carried by larger volumes of gas, is required in cutting copper.

It has thus been demonstrated by the above examples that the metal cutting method of this invention is very satisfactory in reducing the size of large blocks of metal to smaller, mechanically handleable portions.

One of the particular advantages of the present process is that the large volume of very hot gas flowing at a high mass flow rate over the burning mild steel and aluminum rods, impinges on a substantial surface area of the large block of metal to be cut, transfers a significant amount of heat in the gas and thereby melts substantial portions of the block and allows the molten metal to run away.

As has been discussed above, the burning bar of the present invention can be used to melt grooves and thus cut any block or structural element made of a substance having a high melting point, which has a relatively large surface area and substantial depth or thickness. Even naturally occurring geological structures, rocks and large pieces of rocks in a pile, may be cut to smaller, more readily handleable portions by the present device and method.

Although the present invention has been described with reference to the preferred embodiment, it is to be understood that modifications and variations may be resorted to without departure from the spirit and scope of the invention, as those skilled in the art will readily understand. Such modifications and variations are considered to be within the review and scope of the invention and the appended claims.

I claim:

1. A process for cutting large blocks of metals which are surrounded by gaseous atmosphere and which melt above 1000° C., comprising the steps of:

i) introducing into a mild steel pipe having first and second opposing ends with means to connect, mild steel rods and aluminum rods, said rods being coextensive with said mild steel pipe and intermingled with one another, said aluminum rods comprising up to 20 wt % of said pipe and said rods within said pipe, and packing said rods such that a gas containing at least 80% oxygen introduced at a pressure of at least 80 psi and at least 45 cubic foot per minute flow rate, at one end of said pipe is capable of substantially unimpeded passage;

ii) connecting said mild steel pipe to a handle adapted to receive the first end of said mild steel pipe, said handle having valve means adapted to introducing gas to said mild steel pipe at high pressure;

iii) heating the second end of said mild steel pipe to red heat;

iv) flowing oxygen-containing gas to said second end of said mild steel pipe, thereby igniting to burn said second end of said mild steel pipe and said rods therein, said igniting occurring in the absence of electrical energy, said oxygen-containing gas being at least 80% oxygen and when flowing at a mass flow rate of at least 45 cubic feet per minute, producing a blast of hot oxygen-containing gas exiting from said mild steel pipe, said blast being capable of melting and mobilizing molten metal, and v) impinging said blast of hot oxygen-containing gas on the surface of a solid block of metal having a melting point in excess of 1000° C., thereby melting a groove into said surface of said large block of metal and mobilizing the melted metal out of said groove.

2. A process as claimed in claim 1, wherein said intermingled mild steel rods and aluminum rods have diameters which is less than ¼ inch, and the ratio of the diameter of said mild steel rods to the diameter of said aluminum rods ranges between 1:2 and 2:1.

3. A process as claimed in claim 1, wherein a portion of said metal melted by said blast of hot oxygen containing gas is mobilized in the form of droplets and said droplets are carried away by said blast.

4. A process as claimed in claim 3, wherein said droplets are additionally oxidized into solid oxide particles by said blast of hot oxygen containing gas.

5. A process as claimed in claim 4, wherein a portion of said oxide particles are removed by an exhaust device.

6. A process as claimed in claim 1, wherein said solid block of metal comprises one or more members of the group consisting of: copper, nickel, iron, steel, ferro-nickel, cobalt, molybdenum, manganese, chromium, titanium, niobium, zirconium and precious metals.

7. A process as claimed in claim 1 wherein said solid block of metal is copper.

8. A process as claimed in claim 1, wherein said oxygen containing gas is pure oxygen.

9. A process as claimed in claim 1, wherein said large block of metal is contained in a refractory or concrete structure, and said refractory or concrete structure is also cut by melting a groove into the surface of said refractory or concrete structure.

10. A process as claimed in claim 1, wherein a plurality of blasts Of hot oxygen containing gas exiting from a plurality of burning mild steel pipes each containing therein intermingled steel rods and aluminum rods, said plurality of blasts impinging simultaneously on the surface of said large block of metal having melting point in excess of 1000° C.

11. A process as claimed in claim 1, wherein said mild steel pipe packed with intermingled mild steel rods and aluminum rods therein, is extended by connecting one end of said mild steel pipe having means to connect, to one end of a second similar mild steel pipe, said second similar mild steel pipe having two opposing ends with means to connect and having packed therein intermingled mild steel rods and aluminum rods, said rods being coextensive with said second similar mild steel pipe.

* * * * *